US011959407B2

United States Patent
Ishii et al.

(10) Patent No.: US 11,959,407 B2
(45) Date of Patent: Apr. 16, 2024

(54) DETECTION DEVICE, DETECTION METHOD, AND EXHAUST PURIFICATION DEVICE WITH DETECTION DEVICE

(71) Applicant: ISUZU MOTORS LIMITED, Tokyo (JP)

(72) Inventors: Daiki Ishii, Fujisawa (JP); Naofumi Ochi, Fujisawa (JP); Takanobu Ogawa, Fujisawa (JP); Yuta Kageyama, Fujisawa (JP); Akira Matsutani, Fujisawa (JP); Hitoshi Sato, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 408 days.

(21) Appl. No.: 17/419,630

(22) PCT Filed: Dec. 25, 2019

(86) PCT No.: PCT/JP2019/050847
§ 371 (c)(1),
(2) Date: Jun. 29, 2021

(87) PCT Pub. No.: WO2020/138180
PCT Pub. Date: Jul. 2, 2020

(65) Prior Publication Data
US 2022/0082039 A1    Mar. 17, 2022

(30) Foreign Application Priority Data
Dec. 29, 2018  (JP) .................................. 2018-248797

(51) Int. Cl.
*F01N 3/021* (2006.01)
*B01D 46/42* (2006.01)
(Continued)

(52) U.S. Cl.
CPC ............. *F01N 3/021* (2013.01); *B01D 46/42* (2013.01); *F01N 3/103* (2013.01); *F01N 3/36* (2013.01);
(Continued)

(58) Field of Classification Search
None
See application file for complete search history.

(56) References Cited

U.S. PATENT DOCUMENTS

2016/0040571 A1    2/2016 Aso et al.
2018/0163603 A1*   6/2018 Motegi .................... F01N 3/023

FOREIGN PATENT DOCUMENTS

CN    105026707 A    11/2015
EP    1722082 A2 *  11/2006 ............... F01N 9/00
(Continued)

OTHER PUBLICATIONS

English language machine translation for JP 2014-98363. Retrieved from translationportal.epo.org on Oct. 5, 2023. (Year: 2023).*
(Continued)

*Primary Examiner* — Jason M Greene
(74) *Attorney, Agent, or Firm* — Procopio, Cory, Hargreaves & Savitch LLP (57) ABSTRACT

A detection device detecting collapse of PM collected in a filter provided in an exhaust system flow path of an internal combustion engine includes: a differential pressure sensor configured to acquire a differential pressure between an exhaust inlet side and an exhaust outlet side of the filter; a water generation determination unit configured to determine whether water is generated in the exhaust system flow path; and a PM collapse determination unit configured to determine that at least a part of the PM collected in the filter has collapsed when a PM accumulation amount estimated based on the acquired differential pressure has increased by a
(Continued)

predetermined amount or more within a predetermined period in a state where the PM accumulation amount estimated based on the acquired differential pressure is equal to or larger than a predetermined first threshold and the water generation determination unit has determined that water is generated.

5 Claims, 5 Drawing Sheets

(51) Int. Cl.
*F01N 3/10* (2006.01)
*F01N 3/36* (2006.01)
*F01N 9/00* (2006.01)

(52) U.S. Cl.
CPC .......... *F01N 9/002* (2013.01); *F01N 2560/08* (2013.01); *F01N 2560/14* (2013.01); *F01N 2900/08* (2013.01); *F01N 2900/1606* (2013.01)

(56) References Cited

FOREIGN PATENT DOCUMENTS

| EP | 1865165 A1 | 12/2007 | |
|---|---|---|---|
| JP | 2006316733 A | 11/2006 | |
| JP | 2014-98363 | * 5/2014 | ............. F01N 3/023 |
| JP | 2014098363 A | 5/2014 | |
| JP | 2017180343 A | 10/2017 | |
| WO | 2017073799 A1 | 5/2017 | |

OTHER PUBLICATIONS

International Search Report and Written Opinion for related PCT App No. PCT/JP2019/050847 dated Feb. 18, 2020, 9 pgs. (partial translation).

The State Intellectual Property Office of People's Republic of China, The First Office Action, Application No. CN 201980086791.5, dated Apr. 21, 2022, in 16 pages.

* cited by examiner

DETECTION DEVICE, DETECTION METHOD, AND EXHAUST PURIFICATION DEVICE WITH DETECTION DEVICE

CROSS-REFERENCE TO RELATED APPLICATIONS

This application is a U.S. National Stage entry of PCT Application No: PCT/JP2019/050847 filed on Dec. 25, 2019, which claims priority to Japanese Patent Application No. 2018-248797 filed Dec. 29, 2018, the contents of which are incorporated herein by reference.

TECHNICAL FIELD

The present disclosure relates to a detection device, a detection method, and an exhaust purification device including the detection device.

BACKGROUND ART

As an example of an exhaust purification device, there is known one including a particulate filter (hereinafter, referred to as a filter) that collects particulate matter (hereinafter, referred to as PM) in exhaust gas discharged from an internal combustion engine. In this type of exhaust purification device, a PM accumulation amount in the filter is estimated based on an upstream-downstream differential pressure of the filter, and so-called filter regeneration for combusting and removing PM when the PM accumulation amount has reached a predetermined amount is periodically performed.

Even when the filter regeneration is periodically performed, the filter may get into a so-called PM excessive collection state in which PM is excessively accumulated in the filter. When the filter regeneration is performed in such a PM excessive collection state, cracks or erosion of the filter may occur due to thermal runaway or the like caused by rapid combustion of excessively accumulated PM. As a technique for preventing such filter erosion or the like, for example, Patent Literature 1 discloses a technique for prohibiting filter regeneration when the PM accumulation amount exceeds a predetermined upper limit amount.

CITATION LIST

Patent Literature

Patent Literature 1: JP-A-2006-316733

SUMMARY OF INVENTION

Technical Problem

For example, when the exhaust purification device is placed in a low-temperature environment after the engine is stopped, condensed water due to condensation or the like may be generated in an exhaust pipe. When such condensed water adheres to the PM accumulated in the filter, the PM may collapse due to influence of exhaust gas flowing into the filter after the engine is started, or the like. When the PM collapses, a cell of the filter is partially blocked and the differential pressure is increased, so that there is a possibility that a PM excessive collection state is erroneously detected even though the PM is not actually excessively collected in the filter.

An object of the present disclosure is to effectively detect collapse of PM collected in a filter.

Solution to Problem

A detection device of the present disclosure is a detection device configured to detect collapse of particulate matter collected in a filter provided in an exhaust system flow path of an internal combustion engine, the detection device including: differential pressure acquisition means for acquiring a differential pressure between an exhaust inlet side and an exhaust outlet side of the filter; water generation determination means for determining whether water is generated in the exhaust system flow path; and collapse determination means for determining that at least a part of the particulate matter collected in the filter has collapsed when the acquired differential pressure has increased by a predetermined differential pressure or more within a predetermined period or a particulate matter accumulation amount in the filter estimated based on the acquired differential pressure has increased by a predetermined accumulation amount or more within the predetermined period, in a state where: the acquired differential pressure is equal to or larger than a predetermined first differential pressure threshold or the particulate matter accumulation amount in the filter estimated based on the differential pressure is equal to or larger than a predetermined first accumulation amount threshold; and the water generation determination means has determined that water is generated.

Further, it is preferable that the detection device further includes water temperature acquisition means for acquiring a water temperature of cooling water of the internal combustion engine, and the water generation determination means determines that water is generated in the exhaust system flow path in a case where a water temperature decrease amount during a stop period which is obtained by subtracting a restart-time water temperature from a stop-time water temperature is equal to or larger than a predetermined amount, the restart-time water temperature being acquired by the water temperature acquisition means when the internal combustion engine is restarted, and the stop-time water temperature being acquired by the water temperature acquisition means when the internal combustion engine is stopped.

An exhaust purification device of the present disclosure is an exhaust purification device including: the above-described detection device; the filter; an oxidation catalyst provided in the exhaust system flow path on an exhaust upstream side of the filter; fuel supply means for supplying unburned fuel to the oxidation catalyst; and filter regeneration means for performing filter regeneration in which the particulate matter accumulated in the filter is combusted and removed by supplying the unburned fuel by the fuel supply means when the collapse determination means determines that the particulate matter has collapsed.

Further, it is preferable that the filter regeneration means performs the filter regeneration also when the acquired differential pressure has reached a predetermined second differential pressure threshold larger than the first differential pressure threshold or the particulate matter accumulation amount in the filter estimated based on the differential pressure has reached a predetermined second accumulation amount threshold larger than the first accumulation amount threshold.

Further, it is preferable that the exhaust purification device further includes: excessive collection determination means for determining an excessive collection state in which the particulate matter is excessively collected in the filter when the acquired differential pressure has reached a predetermined third differential pressure threshold larger than the second differential pressure threshold or the particulate matter accumulation amount in the filter estimated based on the differential pressure has reached a predetermined third accumulation amount threshold larger than the second accumulation amount threshold; and prohibition means for prohibiting the filter regeneration means from performing the filter regeneration when the excessive collection state is determined by the excessive collection determination means.

A detection method of the present disclosure is a detection method for detecting collapse of particulate matter collected in a filter provided in an exhaust system flow path of an internal combustion engine, and the detection method includes: acquiring a differential pressure between an exhaust inlet side and an exhaust outlet side of the filter and determining whether water is generated in the exhaust system flow path; and determining that at least a part of the particulate matter collected in the filter has collapsed when the acquired differential pressure has increased by a predetermined differential pressure or more within a predetermined period or a particulate matter accumulation amount in the filter estimated based on the acquired differential pressure has increased by a predetermined accumulation amount or more within the predetermined period, in a state where: the acquired differential pressure is equal to or larger than a predetermined first differential pressure threshold or the particulate matter accumulation amount in the filter estimated based on the differential pressure is equal to or larger than a predetermined first accumulation amount threshold; and the determining determines that water is generated in the exhaust system flow path.

Advantageous Effects of Invention

According to the technique of the present disclosure, the collapse of PM collected in the filter can be effectively detected.

DESCRIPTION OF EMBODIMENTS

Hereinafter, a detection device, a detection method, and an exhaust purification device including the detection device according to the present embodiment will be described with reference to the accompanying drawings. The same components are denoted by the same reference numerals, and names and functions of these components are also the same. Therefore, detailed descriptions of the same components are not repeated.

Figure 1:
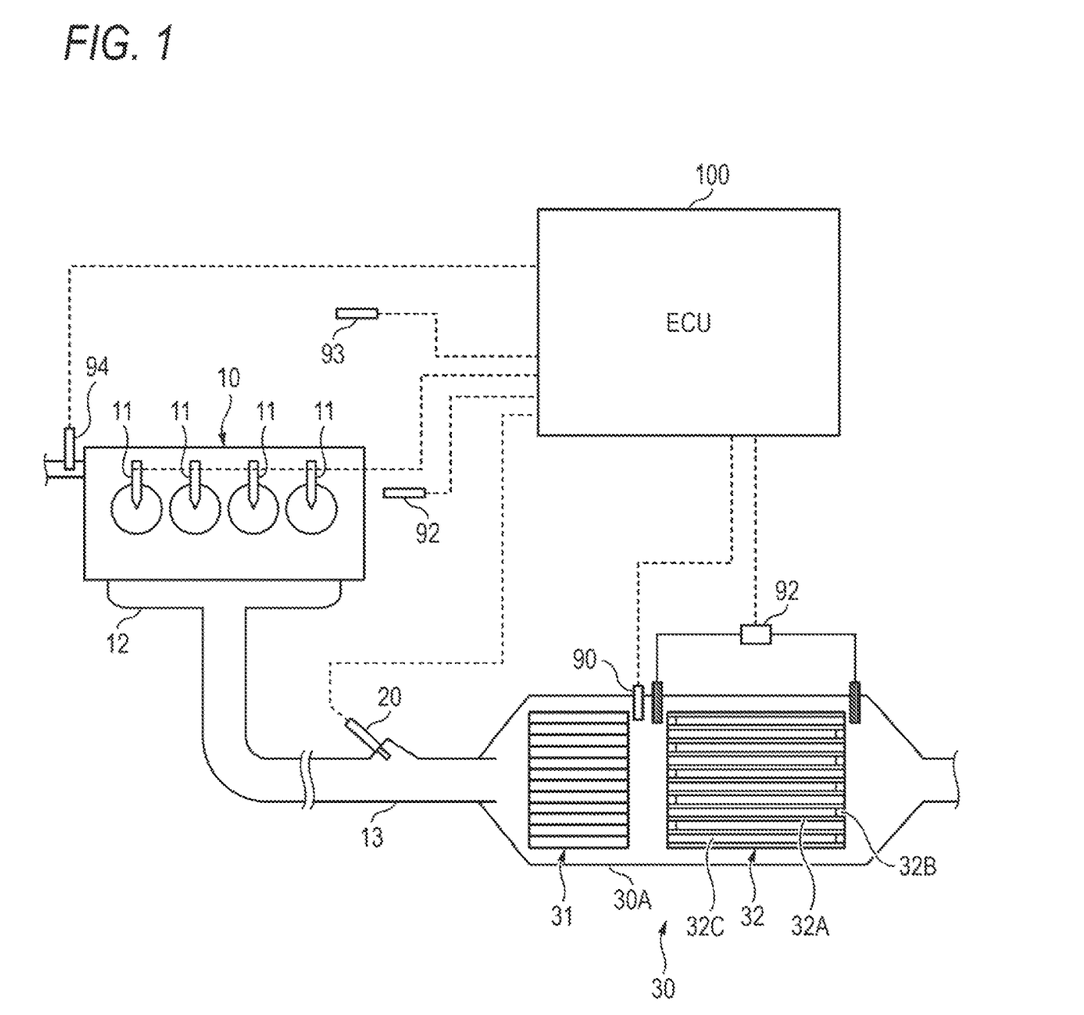
FIG. 1 is a schematic overall configuration diagram showing an exhaust system of an internal combustion engine according to the present embodiment.

FIG. 1 is a schematic overall configuration diagram showing an exhaust system of an internal combustion engine according to the present embodiment.

As shown in FIG. 1, each cylinder of an engine (internal combustion engine) 10 is provided with an in-cylinder injector 11 (an example of fuel supply means) that directly injects fuel into the cylinder. A fuel injection amount, an injection timing, the number of injections, and the like of the in-cylinder injector 11 are controlled according to an instruction signal received from an electronic control unit (ECU) 100.

The engine 10 is provided with an exhaust manifold 12 (an example of an exhaust system flow path) that collects exhaust gas discharged from each cylinder. An exhaust pipe 13 (an example of the exhaust system flow path) for discharging exhaust gas is connected to the exhaust manifold 12. The exhaust pipe 13 is provided with an exhaust pipe injector 20 (an example of the fuel supply means), an exhaust post-treatment device 30, and the like in this order from an exhaust upstream side.

The exhaust post-treatment device 30 includes a case 30A (an example of the exhaust system flow path) connected to the exhaust pipe 13. An oxidation catalyst 31 and a filter 32 are accommodated in the case 30A in this order from the exhaust upstream side. An exhaust temperature sensor 90 that acquires a temperature TE of the exhaust gas flowing into the filter 32 is provided immediately downstream (outlet portion) of the oxidation catalyst 31. A differential pressure sensor 91 (differential pressure acquisition means) that acquires an upstream-downstream differential pressure ΔP of the filter 32 is provided at an exhaust inlet and an exhaust outlet of the filter 32. Sensor values of the sensors 90, 91 are transmitted to the ECU 100 that is electrically connected with the sensors.

The oxidation catalyst 31 is formed, for example, by supporting a catalyst component or the like on a surface of a ceramic carrier such as a cordierite honeycomb structure. When unburned fuel (HC) is supplied by post injection of the in-cylinder injector 11 or exhaust pipe injection of the exhaust pipe injector 20, the oxidation catalyst 31 oxidizes the unburned fuel to raise an exhaust temperature.

The filter 32 is formed, for example, by arranging many cells 32C partitioned by porous partition walls 32A along a flow direction of the exhaust gas and alternately sealing upstream ends and downstream ends of the cells 32C with plugs 32B. In the present embodiment, the filter 32 is preferably accommodated in the case 30A such that a flow path direction (axial direction) of the cell 32C is oriented in a substantially lateral direction (substantially horizontal direction).

The filter 32 collects PM in the exhaust gas to pores and surfaces of the partition walls 32A, and performs filter regeneration for periodically combusting and removing the accumulated PM. The filter regeneration is performed by supplying unburned fuel to the oxidation catalyst 31 by the post injection of the in-cylinder injector 11 and/or the exhaust pipe injection of the exhaust pipe injector 20, and raising a temperature of the exhaust gas flowing into the filter 32 to a PM combustion temperature (for example, about 600° C.). Details of the filter regeneration will be described later.

An engine speed sensor 92 acquires an engine speed Ne from a crankshaft (not shown) of the engine 10. An accelerator opening sensor 93 acquires a fuel injection amount Q (an instruction value to the in-cylinder injector 11) of the engine 10 according to an amount of pressing on an accelerator pedal (not shown). A cooling water temperature sensor 94 (water temperature acquisition means) acquires a cooling water temperature TW in a cooling water circuit (not shown) of the engine 10. Sensor values of these sensors 92 to 94 are transmitted to the ECU 100 that is electrically connected with the sensors.

Figure 2:
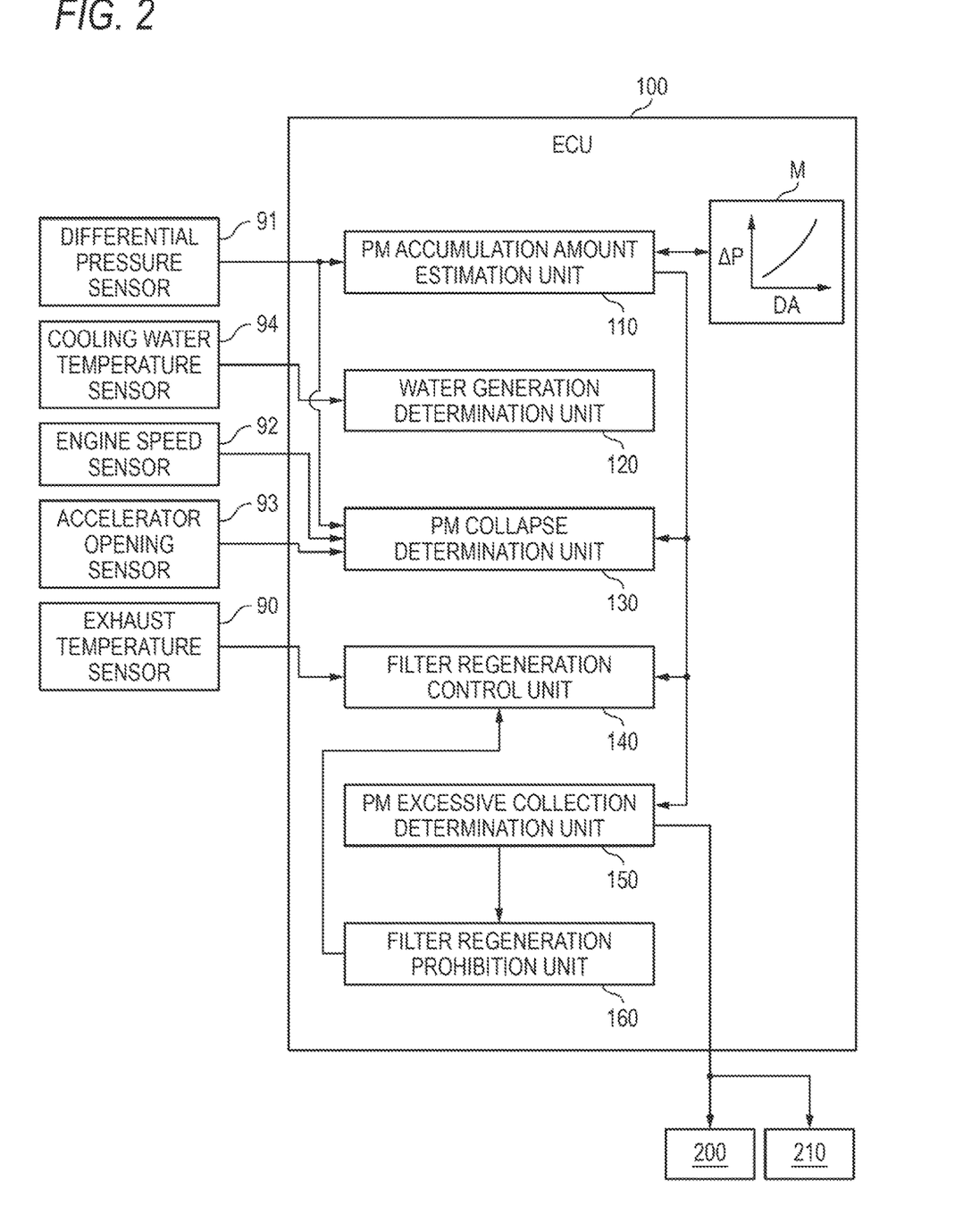
FIG. 2 is a schematic functional block diagram showing an electronic control unit and a related peripheral configuration according to the present embodiment.

FIG. 2 is a schematic functional block diagram showing the ECU 100 and a related peripheral configuration according to the present embodiment.

The ECU 100 is configured to perform various controls on the engine 10 and the like, and includes a central processing unit (CPU), a read only memory (ROM), a random access memory (RAM), an input port, an output port, and the like.

The ECU 100 includes, as a part of functional elements thereof, a PM accumulation amount estimation unit 110, a water generation determination unit 120, a PM collapse determination unit 130, a filter regeneration control unit 140, a PM excessive collection determination unit 150, and a filter regeneration prohibition unit 160. These functional elements are described as being provided in the ECU 100 which is integrated hardware, but a part of these functional elements may be provided in separate hardware.

The PM accumulation amount estimation unit 110 estimates a PM accumulation amount DA of the filter 32 based on the upstream-downstream differential pressure ΔP of the filter 32 received from the differential pressure sensor 91. Specifically, a memory of the ECU 100 stores a PM accumulation amount map M which is created in advance and defines a relationship between the upstream-downstream differential pressure ΔP of the filter 32 and the PM accumulation amount DA. In the PM accumulation amount map M, the PM accumulation amount DA is set to increase as the upstream-downstream differential pressure ΔP increases. The PM accumulation amount estimation unit 110 estimates the PM accumulation amount DA of the filter 32 at predetermined intervals or in real time by referring to the PM accumulation amount map M and based on the upstream-downstream differential pressure ΔP received from the differential pressure sensor 91. A method of estimating the PM accumulation amount DA is not limited to the method using the map M, and the PM accumulation amount DA may be estimated based on an arithmetic expression or the like.

The water generation determination unit 120 determines whether water such as condensed water generated due to condensation in the exhaust system flow path including the exhaust pipe 13, the case 30A, and the like is generated in the exhaust system flow path. Specifically, when the engine 10 is stopped by an OFF operation of an ignition switch (not shown), the water generation determination unit 120 stores a cooling water temperature (hereinafter, referred to as a stop-time cooling water temperature TW1) detected by the cooling water temperature sensor 94 at that time into the memory of the ECU 100. Further, when the engine 10 is restarted by an ON operation of the ignition switch, the water generation determination unit 120 acquires a cooling water temperature (hereinafter, referred to as a restart-time cooling water temperature TW2) detected by the cooling water temperature sensor 94 at that time. Then, when a water temperature decrease amount ΔTW (=TW1-TW2) during an engine stop period obtained by subtracting the restart-time cooling water temperature TW2 from the stop-time cooling water temperature TW1 is equal to or larger than a predetermined upper limit decrease amount threshold $\Delta TW_{Max}$, the water generation determination unit 120 determines that water is generated in the exhaust system flow path. The upper limit decrease amount threshold $\Delta T_{Max}$ may be set, for example, by acquiring a water temperature decrease amount of the cooling water, which can cause condensed water generation in the exhaust system flow path, by an experiment or the like in advance when the engine 10 is placed in a low-temperature environment during the stop period.

Figure 3A:
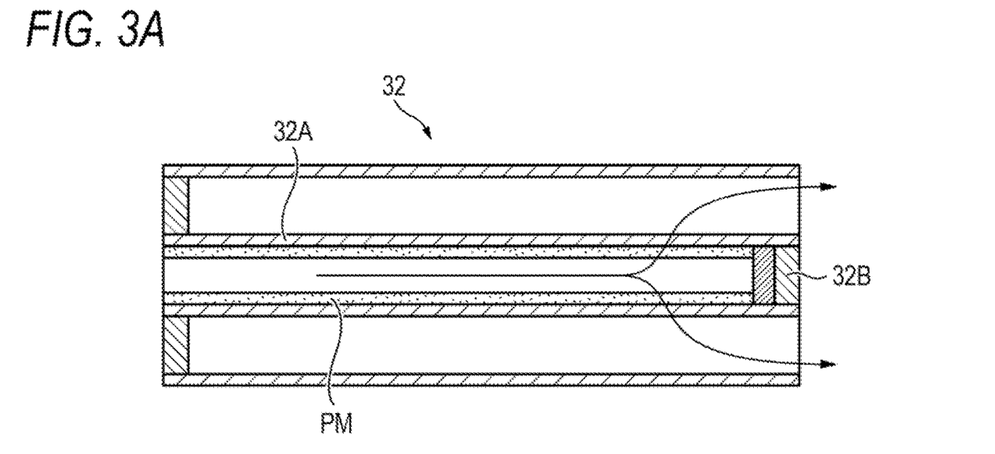
FIG. 3A is a schematic diagram illustrating an example of a flow until PM accumulated in a filter according to the present embodiment collapses and blocks a cell.
Figure 3B:
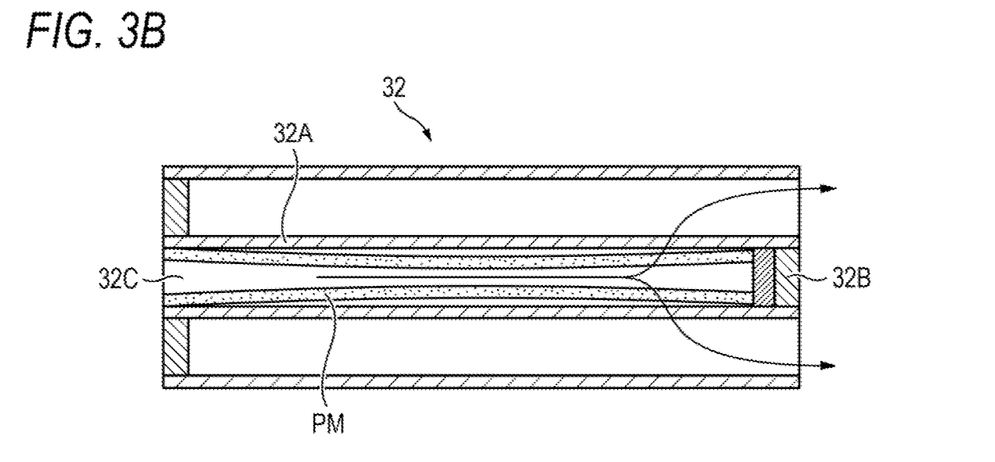
FIG. 3B is a schematic diagram illustrating the example of the flow until the PM accumulated in the filter according to the present embodiment collapses and blocks the cell.
Figure 3C:
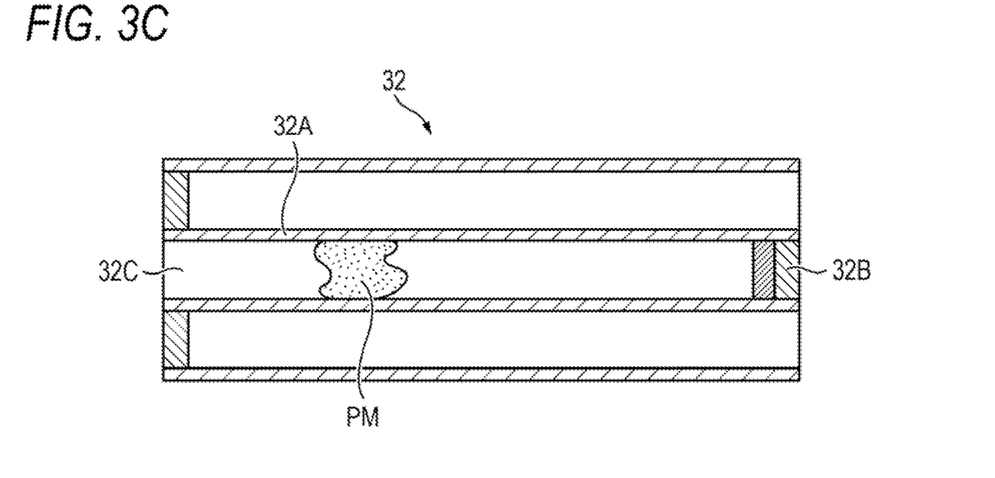
FIG. 3C is a schematic diagram illustrating the example of the flow until the PM accumulated in the filter according to the present embodiment collapses and blocks the cell.

The PM collapse determination unit 130 determines whether PM collapse occurs in which the PM collected in the filter 32 falls from the partition walls 32A of the filter 32 into the cell 32C. Here. PM collapse refers to a state which, for example, PM accumulated on the partition walls 32A of the filter 32, as shown in FIG. 3A, floats from the partition walls 32A due to adhesion of water such as condensed water and protrudes toward an axial center side of the cell 32C as shown in FIG. 3B, and thereafter, as shown in FIG. 3C, the protruding PM collapses into the cell 32C under influence of exhaust gas or the like passing through the filter 32 and partially blocks the cell 32C.

Figure 4:
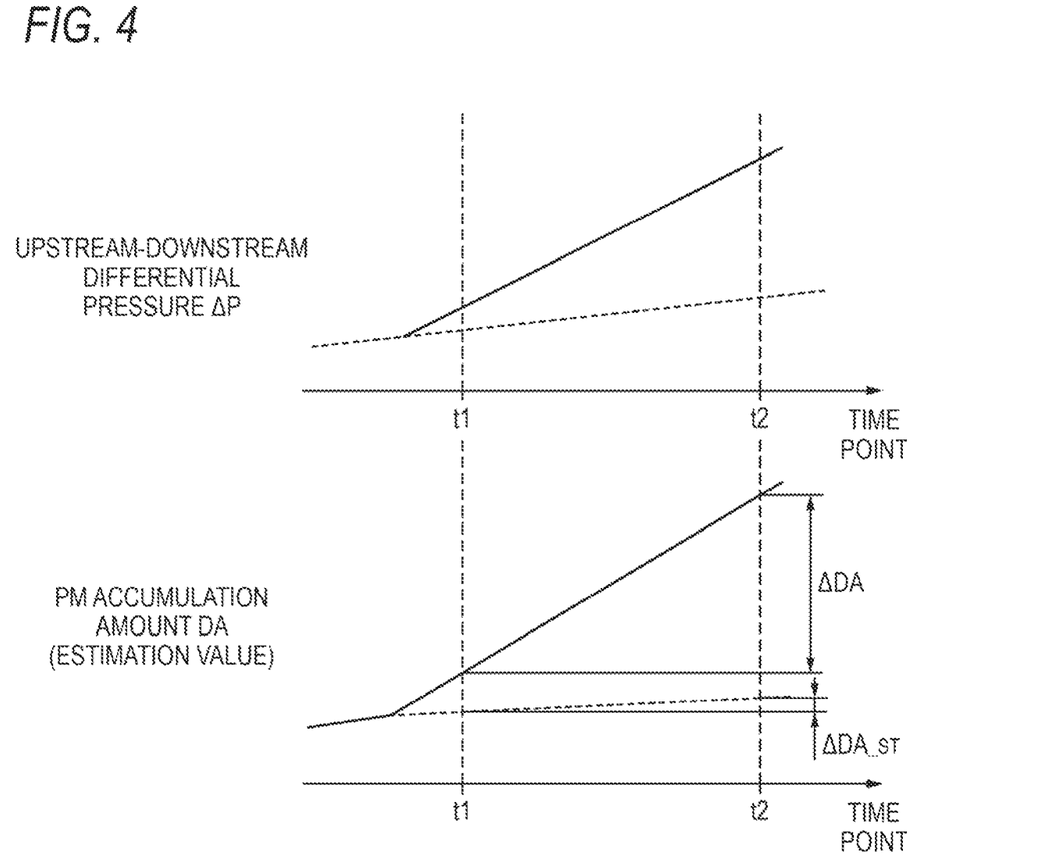
FIG. 4 is a timing chart illustrating an example of a change in an upstream-downstream differential pressure of the filter, which increases due to PM collapse, and a change in PM accumulation amount estimated based on the upstream-downstream differential pressure.

The PM collapse determination unit 130 determines that PM collapse has occurred in a case where, in a state where the PM accumulation amount DA estimated by the PM accumulation amount estimation unit 110 is equal to or larger than a predetermined first accumulation amount threshold DA1 which indicates that the PM is accumulated to some extent in the filter 32 (or when the upstream-downstream differential pressure ΔP is equal to or larger than a predetermined first differential pressure threshold ΔP1) and the water generation determination unit 120 has determined that the water is generated, the PM accumulation amount DA (or the upstream-downstream differential pressure ΔP) estimated by the PM accumulation amount estimation unit 110 increases at an abnormal rate. Whether a degree of increase in the PM accumulation amount DA corresponds to an abnormal increase may be determined by, for example, as shown in FIG. 4, determining that the degree of increase corresponds to the abnormal increase in a case where an increase amount ΔDA of the PM accumulation amount DA (or an increase amount $\Delta P_{Inc}$ of the upstream-downstream differential pressure ΔP) from a time point t1 to a time point t2 increases by a predetermined amount or more with respect to a normal reference PM increase amount $\Delta DA_{ST}$ (or a reference differential pressure increase amount $\Delta P_{Inc\_ST}$) estimated based on an operating state of the engine 10 or the like. The operating state of the engine 10 may be acquired by, for example, the engine speed sensor 92, the accelerator opening sensor 93, or the like.

In this way, by detecting the PM collapse based on the degree of increase in the PM accumulation amount DA during a predetermined period from the time point t1 to the time point t2, a so-called erroneous determination in which the PM excessive collection state is determined by that the PM accumulation amount DA simply shows a large value can be effectively prevented. The determination of the PM collapse is not limited to the determination based on the PM accumulation amount DA, and the determination may be made based on a degree of increase in the upstream-downstream differential pressure ΔP.

The filter regeneration control unit 140 executes filter regeneration for combusting and removing PM from the filter 32 in a case where (1) the PM collapse determination unit 130 determines that the PM collapse has occurred, or (2) the PM accumulation amount DA estimated by the PM accumulation amount estimation unit 110 has reached a predetermined second accumulation amount threshold DA2 larger than the first accumulation amount threshold DA1 (or the upstream-downstream differential pressure ΔP has reached a predetermined second differential pressure threshold ΔP2 larger than the first differential pressure threshold P1).

The filter regeneration is performed by raising the temperature of the exhaust gas flowing into the filter 32 to the PM combustion temperature by supplying unburned fuel to the oxidation catalyst 31 by post injection and/or exhaust pipe injection. The fuel injection amount during filter regeneration may be feedback-controlled based on, for example, a deviation between a target PM combustion temperature and the exhaust gas temperature TE acquired by the exhaust gas temperature sensor 90. The filter regeneration is ended, for example, when the PM accumulation amount DA estimated by the PM accumulation amount estimation unit 110 decreases to a predetermined lower limit accumulation amount (or the upstream-downstream differential pressure ΔP reaches a predetermined lower limit differential pressure), or when a time elapsed from the start of the filter regeneration reaches a predetermined upper limit time.

When the PM accumulation amount DA estimated by the PM accumulation amount estimation unit 110 reaches a predetermined third accumulation amount threshold DA3 larger than the second accumulation amount threshold DA2 (or when the upstream-downstream differential pressure ΔP reaches a predetermined third differential pressure threshold ΔP3 larger than the second differential pressure threshold ΔP2), the PM excessive collection determination unit 150 determines a PM excessive collection state in which the PM is excessively accumulated in the filter 32. When the PM excessive collection state is determined, a warning which causes a display device 200 to display that maintenance of the filter 32 is required is issued. A warning method is not particularly limited, and the warning may be issued by sound from a speaker 210 or the like.

When the PM excessive collection determination unit 150 determines the PM excessive collection state, the filter regeneration prohibition unit 160 prohibits the filter regeneration control unit 140 from performing the filter regeneration. The prohibition of filter regeneration is released when the filter 32 is subjected to maintenance (for example, cleaning, replacement, or the like) in a maintenance factory or the like.

Next, a flow of the detection processing and the filter regeneration processing according to the present embodiment will be described with reference to FIG. 5. This routine is started by, for example, an ON operation of the ignition switch of the engine 10.

In step S100, it is determined whether the PM accumulation amount DA estimated based on the upstream-downstream differential pressure ΔP of the filter 32 is equal to or larger than the predetermined first accumulation amount threshold DAL. In case where the PM accumulation amount DA is equal to or larger than the first accumulation amount threshold DA1 (Yes), the control proceeds to step S110. On the other hand, in a case where the PM accumulation amount DA is less than the first accumulation amount threshold DA1 (No), the control repeats the determination processing in step S100.

In step S110, it is determined whether the water temperature decrease amount ΔTW (=TW1-TW2) during an engine stop period, which is obtained by subtracting the current restart-time cooling water temperature TW2 from the stop-time cooling water temperature TW1 stored at the time of previous engine stop, is equal to or larger than the predetermined upper limit decrease amount threshold $\Delta TW_{Max}$. In a case where the water temperature decrease amount ΔTW is equal to or larger than the upper limit decrease amount threshold $\Delta TW_{Max}$ (Yes), the control proceeds to step S120. On the other hand, in a case where the water temperature decrease amount ΔTW is less than the upper limit decrease amount threshold $\Delta TW_{Max}$ (No), the control proceeds to determination of step S150. The processing of step S100 and step S110 may be performed in random order.

In step S120, it is determined that water is generated in the exhaust system flow path including the exhaust pipe 13, the case 30A, and the like. Next, in step S130, it is determined whether the PM accumulation amount DA estimated based on the upstream-downstream differential pressure ΔP has increased at an abnormal rate within a predetermined period. In a case where the PM accumulation amount DA has abnormally increased (Yes), the control proceeds to step S140, it is determined that PM collapse occurs, and the control proceeds to processing of step S200. On the other hand, in a case where the PM accumulation amount DA has not abnormally increased (No), the control proceeds to the determination of step S150.

In step S150, it is determined whether the PM accumulation amount DA estimated based on the upstream-downstream differential pressure ΔP is equal to or larger than the predetermined second accumulation amount threshold DA2. In a case where the PM accumulation amount DA is equal to or larger than the second accumulation amount threshold DA2 (Yes), the control proceeds to determination of step S160. On the other hand, in a case where the PM accumulation amount DA is less than the second accumulation amount threshold DA2 (No), the control repeats the determination processing of step S150.

In step S160, it is determined whether the PM accumulation amount DA estimated based on the upstream-downstream differential pressure ΔP is equal to or larger than the predetermined third accumulation amount threshold DA3. In a case where the PM accumulation amount DA is equal to or larger than the third accumulation amount threshold DA3 (Yes), the control proceeds to step S300, the PM excessive collection state is determined, the filter regeneration is prohibited in step S310, and then the control ends. On the other hand, in a case where the PM accumulation amount DA is less than the third accumulation amount threshold DA3 (No), the control proceeds to the processing of step S200.

When the control proceeds from step S140 or step S160 to step S200, the filter regeneration based on the post injection or the exhaust pipe injection is performed. Next, in step S210, it is determined whether an ending condition of the filter regeneration is satisfied. The ending condition of the filter regeneration may be satisfied in a case where the PM accumulation amount DA decreases to a predetermined lower limit accumulation amount or in a case where a time elapsed from the start of the filter regeneration reaches a predetermined upper limit time. In a case where the ending condition is satisfied (Yes), the control proceeds to determination of step S220. On the other hand, in a case where the ending condition is not satisfied (No), the control continues the processing of step S200.

In step S220, it is determined whether the engine 10 is stopped by an OFF operation of the ignition switch. In a case where the engine 10 is not stopped (No), the control returns to the processing of step S100. On the other hand, in a case where the engine 10 is stopped (Yes), the control proceeds to processing of step S230, the stop-time cooling water temperature TW1 is stored into the memory of the ECU 100, and then the control is ended.

According to the present embodiment described above in detail, in a case where the estimated PM accumulation amount DA has increased at an abnormal rate in a predetermined period from the time point 1t to the time point t2 in a state where the PM accumulation amount DA of the filter 32 is equal to or larger than the first accumulation amount threshold DA1 and it is determined that water is generated in the exhaust system flow path, it is determined that the PM collapse, in which at least a part of the PM collected in the filter 32 is collapsed, has occurred. That is, PM collapse can be effectively detected based on the degree of increase in PM accumulation amount DA during the predetermined period from the time point t1 to the time point t2. Therefore, it is possible to effectively prevent a so-called erroneous determination in which the PM excessive collection state is uniformly determined by that the PM accumulation amount DA simply shows a large value even though the PM is not actually excessively collected in the filter 32.

Further, when the PM collapse is detected, the filter regeneration for combusting and removing the PM is performed. Therefore, when the PM has collapsed, the PM partially blocking the cell 32C due to the collapse is appropriately combusted and removed, and the filter 32 can continue to be used even after the PM collapse.

The present disclosure is not limited to the above-described embodiment, and can be appropriately modified and implemented without departing from the spirit of the present disclosure.

Figure 5:
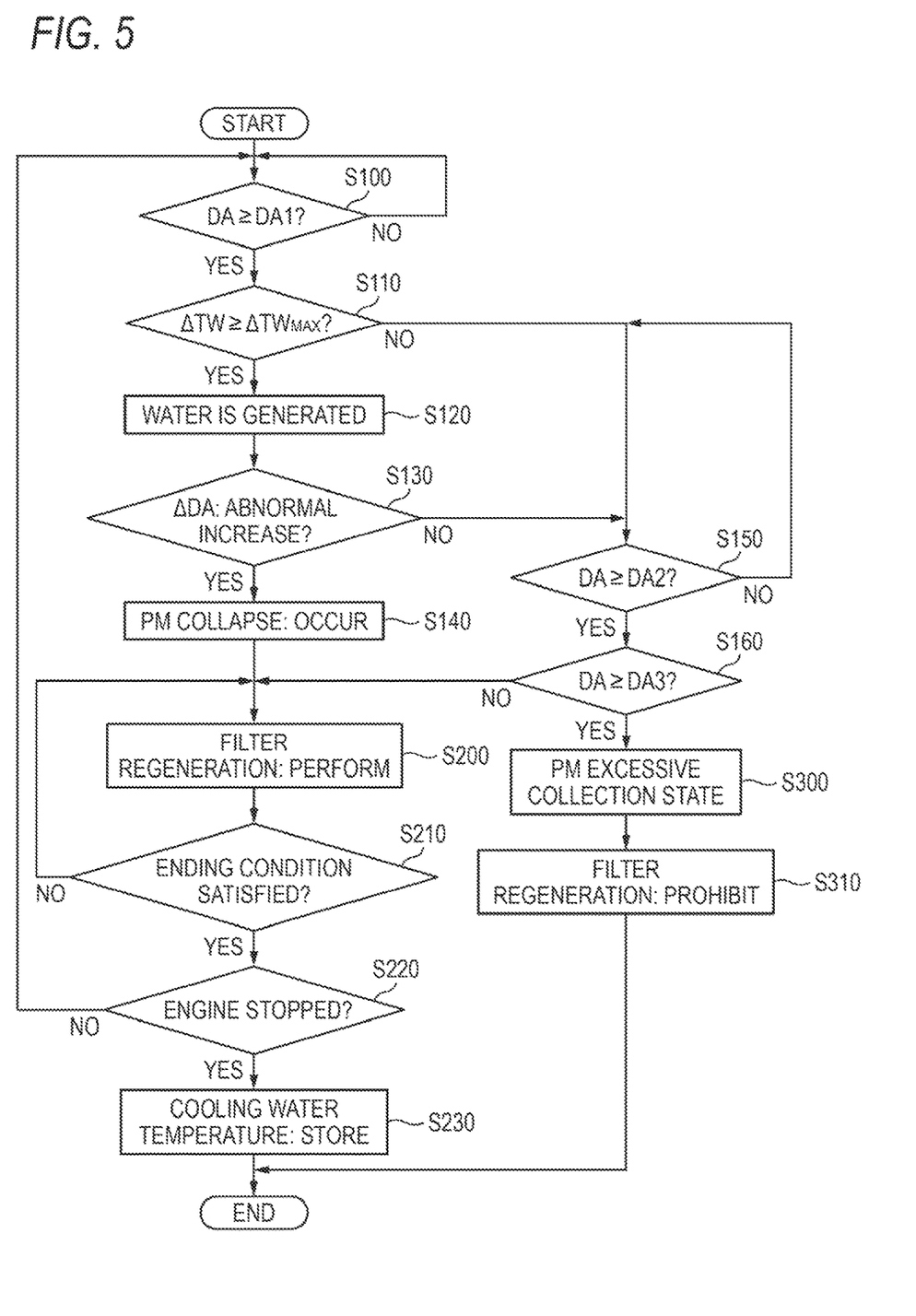
FIG. 5 is a flow chart illustrating detection processing and filter regeneration processing according to the present embodiment.

For example, in the flow shown in FIG. 5, it may be determined whether a temperature of the oxidation catalyst 31 has reached a predetermined activation temperature (for example, about 200° C.) based on a sensor value of the exhaust temperature sensor 90 before the filter regeneration in step S200 is executed, and when the temperature of the oxidation catalyst 31 has not reached the activation temperature, catalyst temperature raising control may be performed to cause an intake throttle or the in-cylinder injector 11 to execute early post injection (injection performed at a timing close to an after injection).

In the above embodiment, the filter regeneration is performed by the post injection or the exhaust pipe injection, but the filter 32 may be provided with a heater or the like, and the PM may be combusted and removed by the heater. The engine 10 is not limited to the illustrated four-cylinder engine, and may be a single-cylinder engine or a multi-cylinder engine other than the four-cylinder engine.

The present application is based on Japanese Patent Application No. 2018-248797 filed on Dec. 29, 2018, and the contents thereof are incorporated herein as reference.

INDUSTRIAL APPLICABILITY

The detection device, the detection method, and the exhaust purification device including the detection device of the present disclosure are useful in that the collapse of the PM collected in the filter can be effectively detected.

REFERENCE SIGNS LIST

10: engine (internal combustion engine)
11: in-cylinder injector (fuel supply means)
12: exhaust manifold (exhaust system flow path)
13: exhaust pipe (exhaust system flow path)
20: exhaust pipe injector (fuel supply means)
30: exhaust post-treatment device
30A: case (exhaust system flow path)
31: oxidation catalyst
32: filter
90: exhaust temperature sensor
91: differential pressure sensor (differential pressure acquisition means)
92: engine speed sensor
93: accelerator opening sensor
94: cooling water temperature sensor (water temperature acquisition means)
100: ECU
110: PM accumulation amount estimation unit
120: water generation determination unit (water generation determination means)
130: PM collapse determination unit (collapse determination means)
140: filter regeneration control unit (filter regeneration means)
150: PM excessive collection determination unit (excessive collection determination means)
160: filter regeneration prohibition unit (prohibiting means)

What is claimed is:

1. A detection device configured to detect collapse of particulate matter collected in a filter provided in an exhaust system flow path of an internal combustion engine, the detection device comprising:
a differential pressure acquisition part configured to acquire a differential pressure between an exhaust inlet side and an exhaust outlet side of the filter;
an electronic control unit (ECU) configured to:
determine whether water is generated in the exhaust system flow path; and
determine that at least a part of the particulate matter collected in the filter has collapsed when the acquired differential pressure has increased by a predetermined differential pressure or more within a predetermined period or a particulate matter accumulation amount in the filter estimated based on the acquired differential pressure has increased by a predetermined accumulation amount or more within the predetermined period, in a state where:
the acquired differential pressure is equal to or larger than a predetermined first differential pressure threshold or the particulate matter accumulation amount in the filter estimated based on the differential pressure is equal to or larger than a predetermined first accumulation amount threshold; and
the electronic control unit has determined that water is generated; and
a water temperature acquisition part configured to acquire a water temperature of cooling water of the internal combustion engine,
wherein the electronic control unit determines that water is generated in the exhaust system flow path in a case where a water temperature decrease amount during a stop period which is obtained by subtracting a restart-time water temperature from a stop-time water temperature is equal to or larger than a predetermined amount, the restart-time water temperature being acquired by the water temperature acquisition part when the internal combustion engine is restarted, and the stop-time water temperature being acquired by the water temperature acquisition part when the internal combustion engine is stopped.

2. An exhaust purification device comprising:
the detection device according to claim 1;
the filter;
an oxidation catalyst provided in the exhaust system flow path on an exhaust upstream side of the filter; and
a fuel supply part configured to supply unburned fuel to the oxidation catalyst;
wherein the electronic control unit is further configured to:
 perform filter regeneration in which the particulate matter accumulated in the filter is combusted and removed by supplying the unburned fuel by the fuel supply part when the electronic control unit determines that the particulate matter has collapsed.

3. The exhaust purification device according to claim 2, wherein the electronic control unit performs the filter regeneration also when the acquired differential pressure has reached a predetermined second differential pressure threshold larger than the first differential pressure threshold or the particulate matter accumulation amount in the filter estimated based on the differential pressure has reached a predetermined second accumulation amount threshold larger than the first accumulation amount threshold.

4. The exhaust purification device according to claim 3, wherein the electronic control unit is further configured to:
 determine an excessive collection state in which the particulate matter is excessively collected in the filter when the acquired differential pressure has reached a predetermined third differential pressure threshold larger than the second differential pressure threshold or the particulate matter accumulation amount in the filter estimated based on the differential pressure has reached a predetermined third accumulation amount threshold larger than the second accumulation amount threshold; and
 prohibit the electronic control unit from performing the filter regeneration when the excessive collection state is determined by the electronic control unit.

5. A detection method for detecting collapse of particulate matter collected in a filter provided in an exhaust system flow path of an internal combustion engine, the detection method comprising:
 acquiring a differential pressure between an exhaust inlet side and an exhaust outlet side of the filter and determining whether water is generated in the exhaust system flow path;
 determining that at least a part of the particulate matter collected in the filter has collapsed when the acquired differential pressure has increased by a predetermined differential pressure or more within a predetermined period or a particulate matter accumulation amount in the filter estimated based on the acquired differential pressure has increased by a predetermined accumulation amount or more within the predetermined period, in a state where:
  the acquired differential pressure is equal to or larger than a predetermined first differential pressure threshold or the particulate matter accumulation amount in the filter estimated based on the differential pressure is equal to or larger than a predetermined first accumulation amount threshold; and
  the determining determines that water is generated in the exhaust system flow path; and
 acquiring a water temperature of cooling water of the internal combustion engine,
wherein the determining includes determining that water is generated in the exhaust system flow path in a case where a water temperature decrease amount during a stop period which is obtained by subtracting a restart-time water temperature from a stop-time water temperature is equal to or larger than a predetermined amount, the restart-time water temperature being acquired in the acquiring of the water temperature when the internal combustion engine is restarted, and the stop-time water temperature being acquired in the acquiring of the water temperature when the internal combustion engine is stopped.

\* \* \* \* \*